United States Patent [19]

Wells

[11] Patent Number: 5,069,688

[45] Date of Patent: Dec. 3, 1991

[54] PRESSURE SWING GAS SEPARATION

[75] Inventor: Alan A. Wells, Ely, England

[73] Assignee: The Haser Company Limited, England

[21] Appl. No.: 435,121

[22] Filed: Nov. 13, 1989

Related U.S. Application Data

[63] Continuation-in-part of Ser. No. 398,306, Aug. 22, 1989, Pat. No. 4,948,360, which is a continuation of Ser. No. 117,783, Nov. 6, 1987, abandoned.

[30] Foreign Application Priority Data

Nov. 6, 1986 [GB] United Kingdom ............... 8626562
Nov. 10, 1988 [GB] United Kingdom ............... 8826378

[51] Int. Cl.⁵ .................................. B01D 53/04
[52] U.S. Cl. ............................ 55/25; 55/58; 55/62; 55/75; 55/179; 55/389
[58] Field of Search ............... 55/25, 26, 33, 58, 62, 55/68, 74, 75, 161–163, 179, 387, 389

[56] References Cited

U.S. PATENT DOCUMENTS

| | | | |
|---|---|---|---|
| 3,121,625 | 2/1964 | Broughton | 55/58 |
| 3,164,454 | 1/1965 | Wilson | 55/68 |
| 3,236,028 | 2/1966 | Rutan | 55/33 |
| 4,144,037 | 3/1979 | Armond et al. | 55/68 X |
| 4,194,891 | 3/1980 | Earls et al. | 55/58 X |
| 4,194,892 | 3/1980 | Jones et al. | 55/58 |
| 4,354,859 | 10/1982 | Keller, II et al. | 55/25 |
| 4,406,675 | 9/1983 | Dangieri et al. | 55/26 |
| 4,702,903 | 10/1987 | Keefer | 55/28 X |
| 4,801,308 | 1/1989 | Keefer | 55/25 |

FOREIGN PATENT DOCUMENTS 0008619 3/1980 European Pat. Off. .
0013680 8/1980 European Pat. Off. .

OTHER PUBLICATIONS

C. L. Pritchard et al., "Design of an Oxygen Concentrator Using the Rapid Pressure-Swing Adsorption Principle", Chem. Eng. Res. Des. vol. 64, Nov. 1986, pp. 467–472.

Primary Examiner—Robert Spitzer
Attorney, Agent, or Firm—Sughrue, Mion, Zinn, Macpeak & Seas

[57] ABSTRACT

A pressure swing gas separator is operated with a pressure difference between its pressurized and depressurized states of less than 0.1 bar. The separator operates at a repetition frequency greater than one cycle per second and preferably between 50 and 200 cycles per second. The separator includes a bed (16, 108, 147) which preferably forms part of a resonant system. A drive for resonant system may be taken from a thermally driven gas resonance device (1, 101) or may be provided by an electrical actuator (140). Preferably the bed is covered by a diaphragm (109, 133, 141) which, as it oscillates, pressurizes and depressurizes the bed of adsorbent material. The diaphragm may cooperate with an annular valve seat (114) to provide a valve to control the entry of gas into the bed.

37 Claims, 7 Drawing Sheets

PRESSURE SWING GAS SEPARATION

This is a Continuation-in-part, of application Ser. No. 07/398,306, filed 08/22/89, U.S. Pat. No. 4,948,360 which is a Continuation of application Ser. No. 07/117,783 filed 11/6/87, now abandoned.

BACKGROUND OF THE INVENTION

Pressure swing gas separators include a bed of adsorbent material which preferentially adsorbs at least one gas from a mixture of gases A pressure swing gas separator uses this preferential adsorption to preferentially remove that gas from a mixture of gases either to provide a gas mixture having a higher concentration of the preferentially adsorbed gas or a depleted gas mixture which has a lower concentration of the preferentially adsorbed gas. In such pressure swing gas separators the adsorbent bed is pressurized with the gas mixture and the preferentially adsorbed component is adsorbed onto the bed until the bed is saturated with that one component of the gas mixture. The bed is then vented and the gas mixture depleted by the preferentially adsorbed component is discharged. The bed is then subjected to a reduced pressure and under these circumstances the gas adsorbed onto the bed is desorbed to produce a gas which is rich in the gas which is preferentially adsorbed.

DISCUSSION OF PRIOR ART

Recently lots of work has been carried out in this field particularly in the so called rapid pressure-swing adsorption regime where the cycle time of the above operation is typically less than 30 seconds and where the adsorbent bed is arranged so that the mixture of gases is introduced into the bed from one side and the gas mixture rich in the preferentially adsorbed component is removed from that same side after desorbtion but the gas or gases which are not preferentially adsorbed onto the adsorbent bed are removed from the opposite side of the adsorbent bed which is continuously vented. Examples of such systems are described in EP-A-0008619; EP-A-0013680; and EP-A-0055160, and in an article entitled "Design of an Oxygen Concentrator using the Rapid Pressure-Swing Adsorbtion Principle" by Pritchard and Simpson in Chem. Eng. Res. Des. Vol. 64 November 1986.

SUMMARY OF THE INVENTION

According to a first aspect of this invention a pressure swing gas separator is operated with a pressure difference between its pressurized and depressurized states of less than 0.1 bar.

With existing rapid pressure swing adsorption gas separators the bed is subjected to a pressure swing of at least half a bar and more usually two-thirds of a bar. A considerable amount of energy is required to provide such a large pressure swing. By operating the pressure swing gas separator in accordance with the first aspect of this invention over a very much lower pressure difference and over a pressure difference of less than 0.1 bar very much less energy is required although, typically, on each pressure swing, a lower volume of gas is produced.

According to a second aspect of this invention a pressure swing gas separator is operated at a repetition frequency greater than one cycle per second.

Preferably the pressure swing gas separator operates at a repetition frequency greater than 10 cycles per second and typically operates at a repetition frequency of between 50 and 200 cycles per second. Accordingly, a pressure swing gas separator in accordance with a second aspect of this invention is cycled very much faster than the earlier proposals for rapid pressure swing adsorption by a factor of as much as one thousand. Preferably the pressure swing gas separator includes a combination of both the first and second aspects of this invention and, under these circumstances the high repetition frequency of its operation more than makes up for the low volume of gas produced in each cycle. A combination of the first and second aspects of this invention provide a good throughput of gas with only a low energy requirement.

According to a third aspect of this invention a pressure swing gas separator includes a bed of adsorbent material and forms part of a resonant system, the pressure swing gas separator including means operating at the resonant frequency of the resonant system to pressurize and depressurize the bed of adsorbent material so that the pressure energy of the desorbed gas mixture is substantially recovered.

By using a resonant system in accordance with the third aspect of this invention much of the energy of compression is conserved since it is possible to conserve the pressure energy contained in the gas component scavenged from the one side of the bed. With the arrangement in accordance with the third aspect of this invention it is substantially only the friction losses in the adsorbent bed which are lost. Accordingly, a further reduction in the amount of energy required to operate a pressure swing gas separator is achieved in accordance with this aspect of the present invention.

Preferably the first three aspects of this invention are combined. The inventor of this application has coined the expression "acoustic pressure swing gas separation" to describe this system.

The means operating at the resonant frequency of the system to pressurize and depressurize the bed of adsorbent material may comprise a thermally driven gas resonance device.

According to a fourth aspect of this invention a pressure swing gas separator includes a bed of adsorbent material, a tuned diaphragm adjacent but spaced from one face of the bed of adsorbent material, driving means arranged to drive the diaphragm at its resonant frequency towards and away from the bed of adsorbent material, valve means to introduce a gas mixture to and exhaust a depleted gas mixture from, a space between the diaphragm and the bed, and a gas outlet in communication with the other face of the adsorbent bed, in use, the movement of the diaphragm towards and away from the adsorbent bed pressurizing and depressurizing it.

The drive means may be formed by a thermally driven gas resonance device.

The thermally driven gas resonance device for use with the third or fourth aspects of this invention may comprise a resonance tube of ogival form which expands in cross-section along its length from one end to the other, a heat source located at one end of the resonance tube, and means to trigger oscillations in a gas in the resonance tube. The heat source and means that trigger oscillations in a gas in the resonance tube are preferably formed by a pulsed combustor having a pulse repetition frequency corresponding to a resonance frequency of the gas resonance tube. Alternatively the thermally driven gas resonance device may comprise a pulsed combustor located in the middle of a substantially spherical resonance chamber. Such a thermally driven gas resonance device has the advantage that the wall friction losses in the resonance device are eliminated altogether. The pulsed combustor produces a substantially spherical expanding wave front which encounters no wall friction whatsoever as it moves from the middle of the resonance chamber to the outside of the resonance chamber.

Preferably the gas resonance device includes means to provide an explosive gas mixture to the pulsed combustor. Preferably the pulsed combustor has a pulse repetition frequency corresponding to the resonance frequency of the substantially spherical resonance chamber. The resonance frequency of a substantially spherical resonance chamber is largely dependent upon its radius. The means to supply the explosive mixture to the pulsed combustor may include a tuned valve or a resonance tube so that the pulsed combustor receives a pulsed supply of explosive mixture. In this case the explosive mixture is preferably supplied at the resonance frequency of the resonance chamber.

Preferably the pressure swing gas separator includes a bed of molecular sieve material located at the widest end of an ogival resonance chamber or at the periphery of a substantially spherical resonance chamber. Preferably the substantially spherical resonance chamber is formed as an icosahedron. In this case each bed of molecular sieve material preferably has a generally circular configuration with the beds being located in the wall of the resonance chamber with three circular beds contained wholly within each substantially triangular segment of the icosahedron and one bed at each point of the icosahedron.

The mechanical oscillations of the gas in the gas resonance device may serve alternately to pressurize and depressurize the bed of adsorbent material or may cause corresponding oscillation of the diaphragm which, in turn, alternately pressurizes and depressurizes the bed of adsorbent material. In this case the diaphragm provides a physical barrier which separates the bed of adsorbent material from the inside of the resonance chamber and so prevents combustion products from the pulsed combustor contaminating the bed of adsorbent material. Preferably the diameter, thickness and stiffness of the diaphragm are selected so that the diaphragm has a natural resonant frequency corresponding to that of the resonance chamber.

The drive means for the diaphragm may be formed by an electrical actuator. In this case, it is preferred that the electrical actuator comprises an armature coil and a stator one of which is connected to the diaphragm and the other of which is held by a fixed surrounding framework, in use, an oscillating current applied to the armature causing the armature, and hence the diaphragm, to oscillate with respect to the stator. The stator may be formed by a permanent magnet but is preferably formed by an electromagnet. When the electrical actuator is powered from the mains it is preferred that the diaphragm is tuned to the mains frequency of 50 or 60 Hz and that the device is driven from a single phase supply.

The drive means for the diaphragm may be formed by a motor, either an electric motor, or an internal combustion engine. In this case the diaphragm may be coupled to a rotary shaft of the motor via a crank or other eccentric connection or the motor may be mounted on the diaphragm be coupled via a crank or other eccentric connection or and be arranged to rotate an unbalanced load.

Preferably the valve means to introduce gas mixture into, and exhaust gas mixture from, the space between the diaphragm and the adsorbent bed comprises an annular valve seat which engages the diaphragm and the diaphragm forms the valve closure member which forms a gas-tight seal against the annular valve seat but which, when the diaphragm moves away from the adsorbent bed, unseats to allow gas to pass between the valve seat and the diaphragm.

The valve means may include an exhaust valve located in the middle of the diaphragm so that the gas mixture moves radially inwards from the annular valve seat towards the middle of the diaphragm. In this case the exhaust valve is arranged to open after the inlet valve but closes at substantially the same time as the inlet valve. One way of achieving this is to have the exhaust valve closure member free to slide within limits on a spindle mounted on the diaphragm so that, in use, as the exhaust valve closure member moves with the diaphragm away from the adsorbent bed it is in a first position on the spindle but as it moves with the diaphragm towards the adsorbent bed it is in a second position on the spindle.

Alternatively the valve formed by the annular valve seat and the diaphragm acts as both an inlet and an exhaust valve. In this case it is preferred that a harmonic vibration is applied to the diaphragm so that, in addition to its fundamental oscillation towards and away from the adsorbent bed there is also a superimposed secondary vibration which appears as a wave moving from one side to the other of the diaphragm. In this way as the diaphragm is moving away from the bed one side of the diaphragm lifts from its annular seat initially. A reduced pressure generated in the bed whilst the diaphragm is moving away from it draws gas mixture into the space between the diaphragm and the bed via the unseated diaphragm valve seat on the one side of the diaphragm. After a delay the other side of the diaphragm also unseats from the annular seat. The gas introduced into the one side of the diaphragm has a sideways momentum which is continued and encouraged by flexing of the diaphragm and causes a gas flow from the one side to the other side of the diaphragm which causes the depleted gas from the space between the bed and the diaphragm to be exhausted from the other side of the diaphragm. As the diaphragm returns towards the adsorbent bed the one side of the diaphragm seats first against the annular valve seat followed by the other side. As the diaphragm continues to move towards the adsorbent bed it pressurizes the bed and then moves away from the bed to depressurize it whereupon the one side of the diaphragm again lifts from its valve seat first and the cycle is repeated. In this way not only is a pressurizing and depressurizing operation carried out on the adsorbent bed by the fundamental oscillation of the diaphragm but also, as a result of the harmonic oscillation imposed upon the diaphragm, a transverse wave motion on the diaphragm is created which drives the gas transversely across the top of the adsorbent bed. This provides a particularly effective scavenge operation which scavenges the depleted gas mixture from the top of the bed on each oscillation of the diaphragm.

This additional harmonic motion can be applied to the diaphragm by, for example, applying an eccentric mass to one side of the diaphragm, preferably matched by a corresponding lightening of the diaphragm on the other side. This is particularly useful when the diaphragm is driven by a thermally driven gas resonance device. Alternatively when the diaphragm is driven by an electrical actuator or a mechanical connection this is located off centre. When the diaphragm is driven via a crank this additional harmonic oscillation can also be achieved by directly coupling one end of the crank to the diaphragm so that the angular tilting of a connecting rod connecting the crank to the diaphragm is applied directly to and results in a corresponding flexing of the diaphragm.

Preferably the pressure swing gas separator in accordance with this invention is arranged so that, in use, the gas mixture enters the bed at a bed entry velocity which is sufficiently low to ensure laminar flow of the gas takes place inside the adsorbent bed. The bed entry velocity at which laminar flow occurs is a function of the particle size of the bed, as will be explained in more detail subsequently, and accordingly, it is preferred that the particle size of the bed is substantially a quarter of a millimeter or less. By establishing laminar flow in the bed firstly the friction losses which occur in the acoustic pressure swing gas separator system are reduced which gives rise to a further reduction in the energy required for separation. However, in addition to this, with laminar flow a more efficient separation occurs between the depleted gas mixture and that which is rich in the gas which is not adsorbed by the adsorbent bed moving from the one face to the other face of the adsorbent bed. This further improves the energy efficiency of the separation process.

Preferably the adsorbent bed is of a wide and shallow configuration in contrast to the arrangements of adsorbent bed used in the conventional rapid pressure swing adsorption systems in which a relatively narrow but deep bed is required for maximum efficiency. Typically the volume of the material in the adsorbent bed is generally similar to that used in the rapid pressure swing adsorption systems for equivalent production of the preferred gas.

BRIEF DESCRIPTION OF THE DRAWINGS

Various examples of and a discussion of some of the theory behind gas pressure swing separation in accordance with this invention will now be described with reference to the accompanying drawings, in which.

DESCRIPTION OF PREFERRED EXAMPLES

Figure 1:
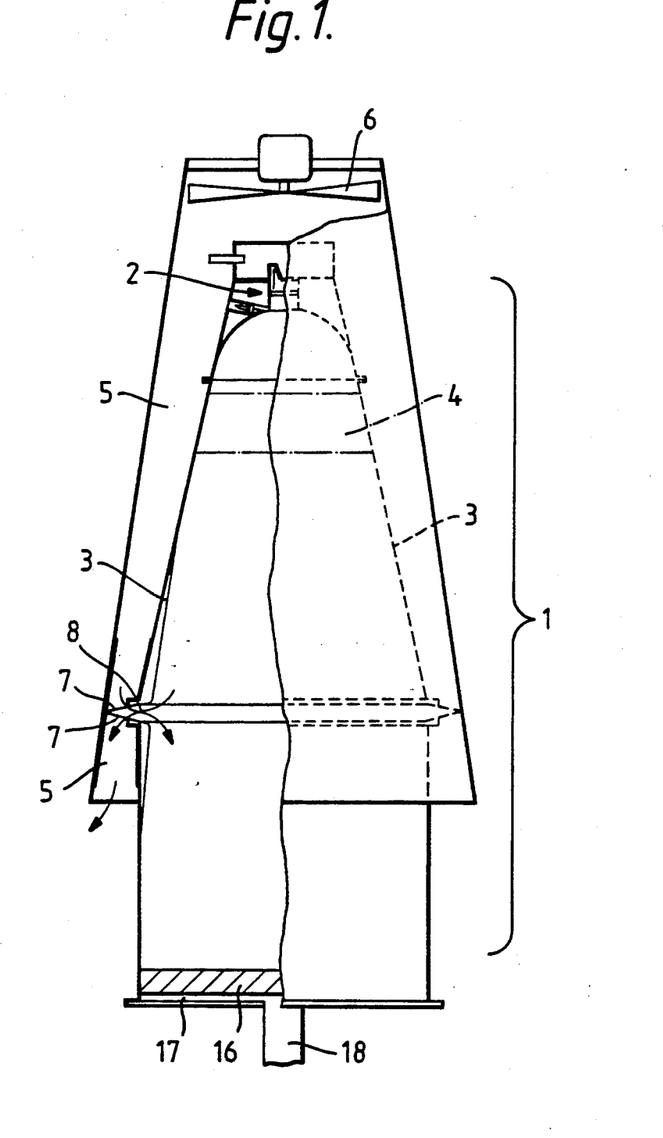
FIG. 1 is a partly sectioned side elevation of a first example.

In the first example a thermally driven gas resonance device 1 is formed by a pulsed heat source 2 mounted at one end of a resonance tube 3 which is ogival with its side walls curved in longitudinal section. The overall dimensions of the resonance tube 3 are such that its height is about three times its base diameter. A regenerator 4 may be included towards the top of the resonance tube and this is made from a thin walled metallic honeycomb or non-metallic honeycomb which is typically made from glass or a glass-like material. An outer concentric annular chamber 5 surrounds the resonance tube 3 and an electrically driven fan 6 is mounted at the top to blow air downwards through the chamber 5. A corrugated annular baffle 7 directs the flow of air through alternate open ports 8 provided in the side wall of the resonance tube 3 at a pressure null point. Air is discharged through the other open ports 8 and a lower portion of the outer chamber 5. The open ports 8 produce orifice flow and therefore the inwards air flow through alternate ports 8 is strongly converging which ensures that charge and discharge through the open ports 8 is not unduly mixed.

Figure 2:
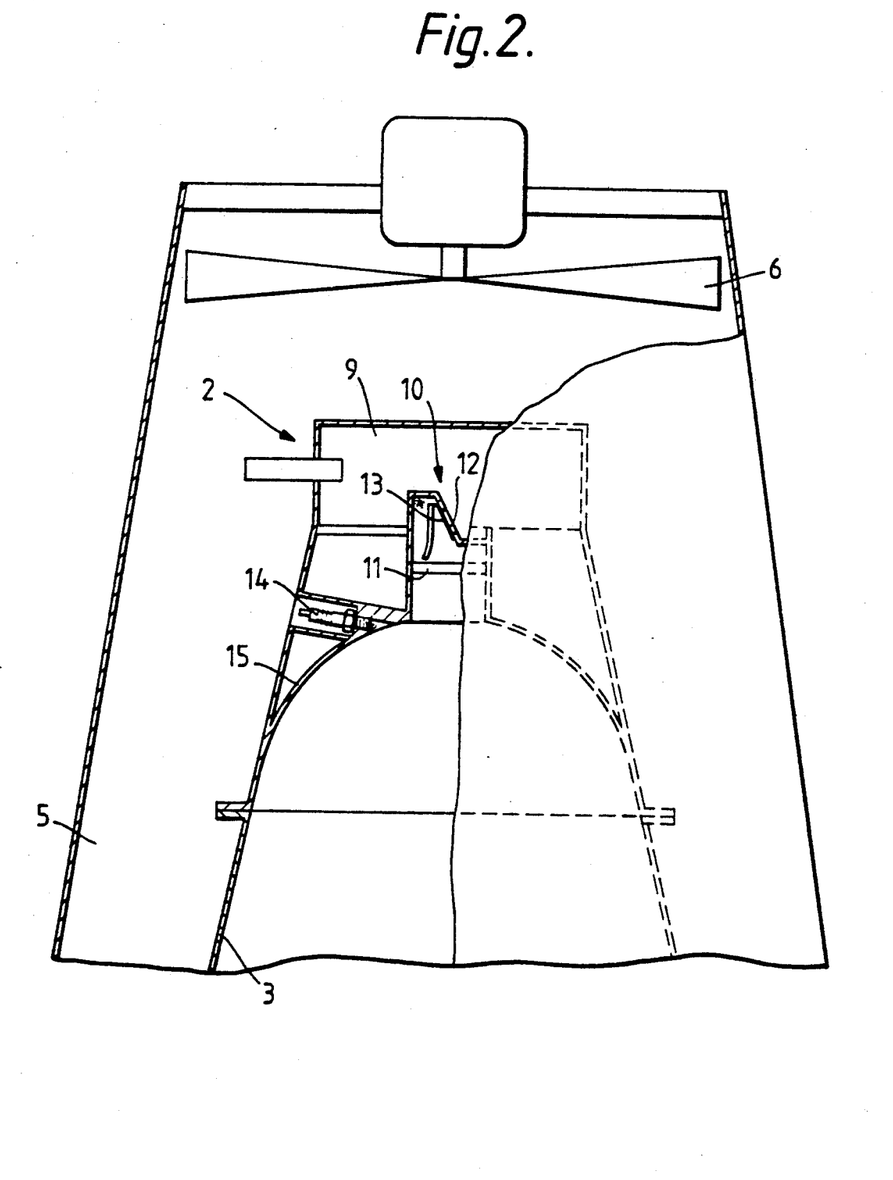
FIG. 2 is a cross-section through a heat source of the first example.

The pulsed heat source 2 is shown in more detail in FIG. 2 and comprises a gas mixing space 9 to which gas and air are supplied and in which they are mixed, a resonant non-return valve 10 of similar resonant frequency to that of the resonance tube 3, and a flame trap 11. The resonant non-return valve 10 may be similar to those fitted to two-stroke engines and comprise an open port 12 covered by a springy plate 13 which is fixed along one edge to the port 12. In response to the instantaneous pressure in the resonance tube 3 being greater than that in the gas mixing space 9 the valve is held closed with the springy plate 13 forming a seal against the edges of the port 12, and in response to an instantaneous reduction in pressure in the resonance tube 3 with respect to that in the gas mixing space 9, the springy plate 13 bends to allow the gas and air mixture to pass through the port 12 and into the resonance tube 3.

In a preferred configuration which leads to gas mixture delivery more closely in phase with the resonance chamber compression pulse, and thus to a concomitant improvement in pulsed combustion, the resonant non-return valve 10 consists of a metal disc of relatively large diameter, placed co-axially with the combustion chamber, clamped at its edge to a slightly concave bed-plate in which the flame trap is centrally located. Gas mixture is introduced at low pressure to an internal annulus close to the clamped edge, and is thereby fed radially inwards in pulses towards the flame trap. The disc is of such thickness that its natural frequency of axial oscillation is lower than that of the resonance cavity so that the combined effect of the gas damping and the cavity pressure pulses is to produce substantially antiphase oscillations of the disc at the resonant frequency of the cavity. These oscillations introduce gas mixture through the flame trap to the combustion chamber at the time of pressure rise instead of the time of maximum suction, and the former diminishes the extent of premature combustion, which is inefficient with regard to heat engine operation.

The pulsed heat source 2 also includes a sparking plug 14 and the top of the resonance tube 3 is formed as a parabolic reflector 15 which spreads the effect of the pulsed heat source substantially uniformly over the end of the resonance tube 3.

The heat engine or gas resonance device 1 drives a gas oscillation down the resonance tube 3 and the vertically oscillating mass of gas functions as a piston producing pressure and adiabatic temperature fluctuations at top and bottom of the tube 3. The oscillations are triggered by the sparking plug 14 initially igniting the gas and air mixture introduced into the top of the resonance tube 3 and then, as the gas in the tube 3 begins to resonate and the valve 10 introduces successive bursts of mixture, these are ignited by the fading flame from the previous ignition. This produces a pulsed combustion which, in a device having a resonance tube of length about 1 m, has a repetition frequency of around 200 Hz. The regenerator 4 increases the efficiency of the gas resonance device 1 by increasing the mean temperature of the top end of the resonance tube 3 and increasing the amplitude of the oscillations produced.

The gas resonance device 1 just described is used to provide the mechanical energy input for a pressure swing gas separator and, in this case, as shown in FIG. 1 a shallow bed 16 of a zeolite which preferentially adsorbs nitrogen is placed towards the lower end of the resonance tube 3 and the base of the resonance tube is closed by a plate 17 including a gas outlet 18. During resonant oscillation in the resonance tube 3 as the air moves forwards into the zeolite bed 16 nitrogen is preferentially adsorbed by the zeolite. As the air moves backwards a reduced pressure is created and the gases adsorbed onto the surface of the zeolite are desorbed so that air rich in nitrogen is desorbed. As a result of the finite displacements of gas that occur during oscillation the average pressure inside the resonance tube 3 is greater than atmospheric so that a flow of gas passes through the zeolite bed 16 resulting in a flow of gas out of the outlet 18 which is rich in oxygen whilst the flow of gas out of the ports 8 and through the lower part of the chamber 5 is rich in nitrogen.

Figure 5:
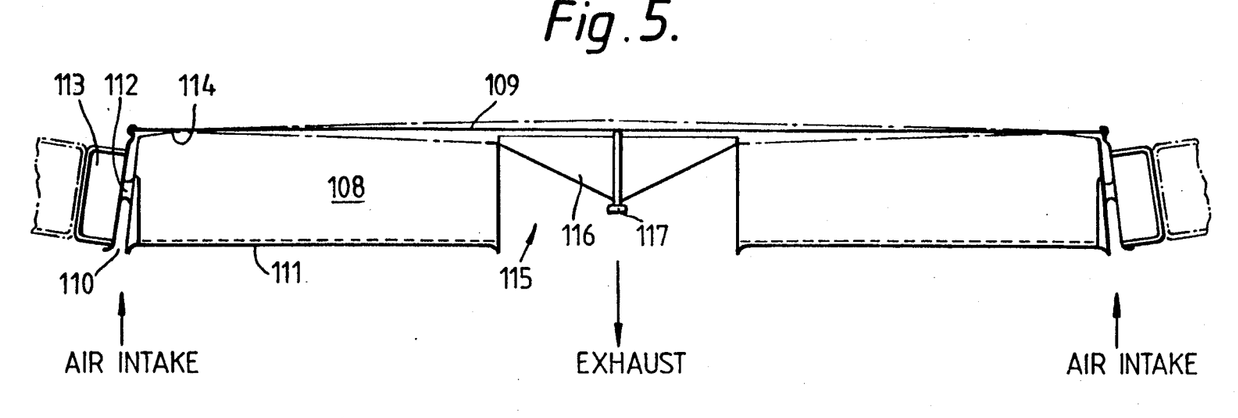
FIG. 5 is a section through a first example of gas-separator module.
Figure 7:
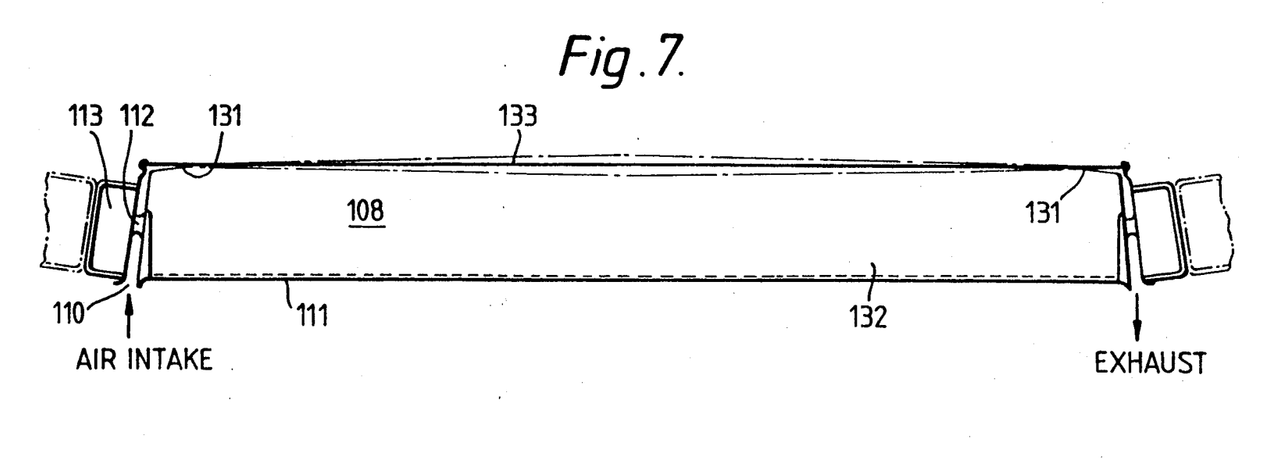
FIG. 7 is a section through a second example of gas-separator module.
Figure 8:
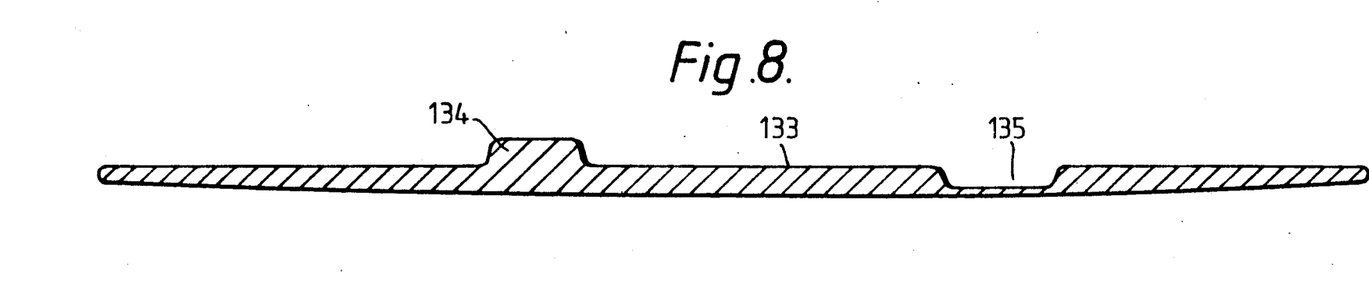
FIG. 8 is a cross-section to an enlarged scale through the diaphragm.

Preferably the zeolite bed 16 is formed as subsequently described with reference to FIGS. 5 or 7 and preferably the wide end of the resonance tube 1 includes a diaphragm as illustrated in FIG. 8.

The details of the gas resonance dynamics, the desirability of the ogival shape of the resonance chamber, a discussion on the wall friction losses, and a discussion on the characteristics of the regenerator 20 are discussed in detail in my co-pending U.S. patent application Ser. No. 117,783 the priority of which is claimed and which is incorporated herein by reference.

Figure 3:
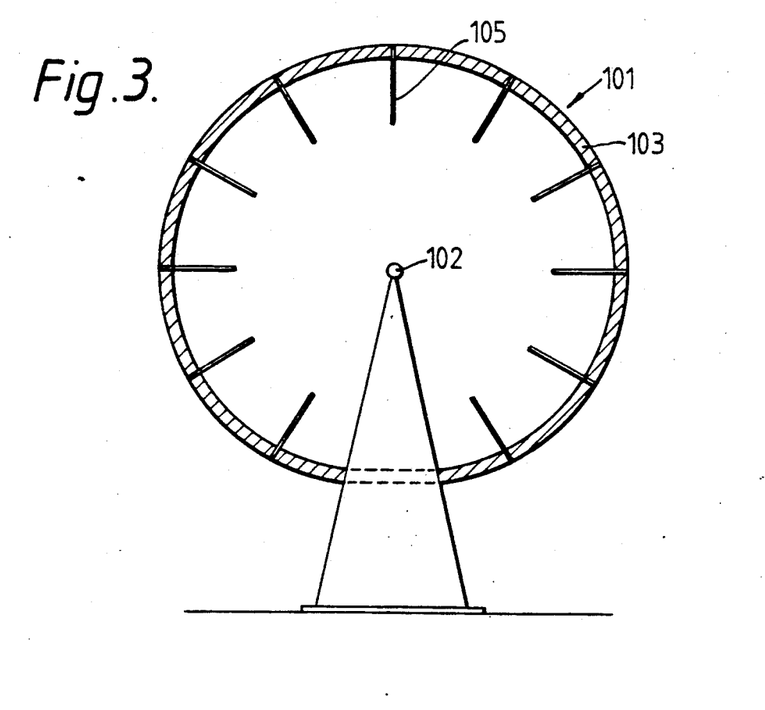
FIG. 3 is a cross-section through a second example.
Figure 4:
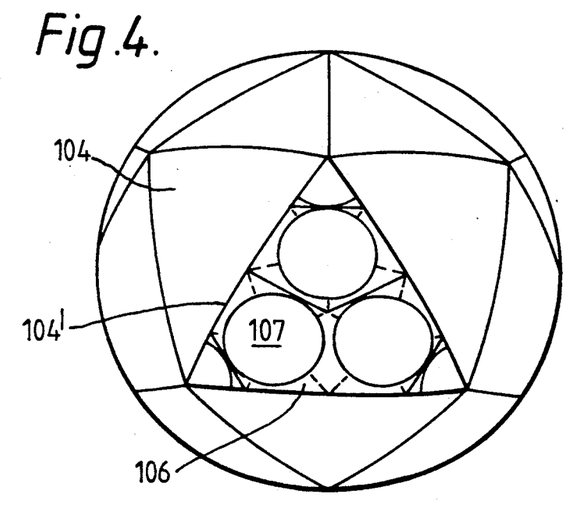
FIG. 4 is a partially cut-away plan of the second example.

A second example of thermally driven gas resonance device is shown in FIGS. 3 and 4 and comprises a generally spherical chamber 101 and a pulsed combustor 102 positioned centrally within the chamber. The combustor 102 includes a tuned non-return valve 10 such as that described in the first example. A combustion mixture of air and an appropriate fuel gas is admitted to the chamber 101 via the tuned non-return valve 10. The combustion mixture is periodically ignited at a frequency matched to the resonant frequency of the spherical chamber 101. A sparking plug is provided in the combustor to cause the initial ignition but subsequently the pulsed combustion is self-sustaining.

As an alternative to the use of a tuned non-return valve 10 in the combustor 102 the combustion mixture may be supplied to the chamber 101 via a resonant gas-supply tube which extends into the chamber 101 and is tuned to supply the combustion mixture in pulses at the required pulse repetition frequency.

The operation of the combustor in the manner described above provides a pulsed heat source at the centre of the chamber 101 which produces a substantially spherical expanding wave front. Since the frequency of the combustor is matched to the resonant frequency of the chamber 101 the combustor drives resonant modes of the chamber, maximizing the efficiency with which the heat energy of combustion is converted into the mechanical energy associated with the pressure swings in the gas within the chamber 101. In this example this mechanical energy is used to drive a gas separator used for oxygen enrichment.

In the second example of the present invention shown in FIGS. 3 and 4 the generally spherical chamber 101 is defined by a hollow icosohedral shell 103 formed of generally triangular elements 104 having curved sides. Open-ended exhaust tubes 105 extend into the chamber 101 from the outer surface of the shell 103. The radially innermost ends of the tubes 105 lie at points spaced from the centre of the spherical chamber 101 by about three-quarters of the sphere radius. There is a pressure null point in the resonant mode of the chamber at this radius. Combustion products can therefore be vented from the chamber 101 at these points with minimum power loss and external noise. If it is required to take the exhaust further away from the chamber 101 then the tubes 105 may project beyond the surface of the shell 103.

Pipes connected to an external water supply (not shown) are positioned concentrically within the exhaust tubes 105. These pipes provide inwardly directed water sprays. A small proportion of the water is converted to steam by the heat source during thermal pulses and so supplements the production of mechanical power. The remaining mist of water droplets cools the gases in the chamber 101 during the subsequent expansion cycle, prior to recompression, so removing excess heat energy and further increasing the efficiency of the device. Heated water aggregated from water droplets collecting on the internal spherical surface of the chamber 101 is drained away at the base and may be cooled and recirculated.

The modules in the chamber 101 are formed as gas-separator modules such as that shown with its outer surface cut-away in the element 104' of FIG. 4. Each gas-separator module comprises a number of circular elements 107. Each element 107 is shown in more detail in FIGS. 5 and 7 and comprises a dished zeolite bed 108 and a diaphragm 109 covering the bed 108 on its inwardly facing surface. Each element 107 is 0.8 meters in diameter and up to 72 such elements may be provided around the inner surface of a chamber 101 of 2 meters radius. In use, the pressure-swings at the periphery of the chamber 101 drive the diaphragm 109 back and forth in the radial direction, that is the direction transverse to the surface of the bed 108. Air is drawn in through an annular inlet 110 surrounding the periphery of the bed 108 and driven through the bed 108 in the manner described in further detail below. Oxygen-enriched gas leaving the bed 108 at its lower surface is collected under a skirt 111 and transferred via ducts 112 to the tubular framework 113 of the icosohedral shell 103. The tubular framework 113 is connected in common to all the gas separator modules 106 and provides a path from the modules 106 to an outlet (not shown) from which the oxygen-enriched gas is piped away.

As well as serving to isolate the zeolite bed 108 from the combustion gases within the chamber 101 the diaphragm 109 also serves to provide a valving arrangement which ensures that air is admitted and depleted air exhausted at appropriate points in the oscillatory cycle. The diaphragm 109 is dimensioned to have the same resonant frequency as the chamber 101. In the present example the diaphragm 109 is formed of steel with a diameter of 0.8 meters and a thickness of 6 mm. The diaphragm 109 is suspended at its edge outside the bed 108 so that in its equilibrium position it clears the periphery of the bed 108 but touches a valve seat 114 formed some 10 cm in from the outer edge of the bed 108. The part of the bed 108 extending radially outwards from this valve seat 114 is sealed so as to be impervious to air. The region of contact between the diaphragm 109 and the bed 108 serves to provide a valve which controls the intake of air from the port 110 to the main part of the bed 108. In the centre of the bed 108 there is a cylindrical exhaust outlet 115 which, when the diaphragm is in its equilibrium position, is sealed by a conical valve member 116. The valve member 116 rides on a spindle 117 fixed to the centre of the diaphragm 109.

Figure 6:
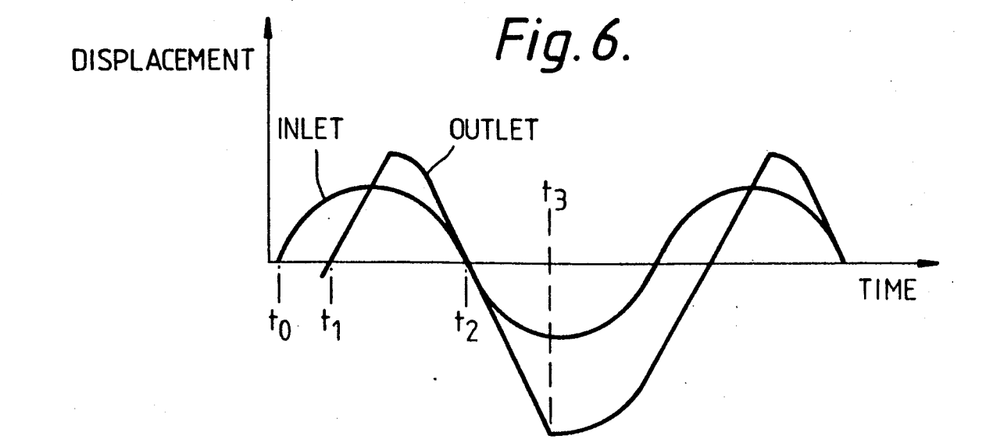
FIG. 6 is a graph showing the displacement with respect to time of the valves of the first example of gas-separator module.

The operational cycle of the pressure-swing gas separator is now described with reference to FIG. 6 which shows the displacement of the inlet valve and the outlet valve with respect to time. At time $t_0$ the diaphragm 109 is in its equilibrium position. Subsequently as the pressure of the gas in the chamber 101 immediately adjacent the diaphragm 109 drops, the diaphragm 109 is drawn back in the radially inwards direction away from the bed 108. The diaphragm 109 immediately clears the seat 114 thereby opening the valve inlet. However the exhaust valve remains closed since there is free movement between the spindle 117 and the valve member 116 so that although the spindle 117 is drawn up, the valve member 116 remains seated. As a result during the period $t_0$ to $t_1$ a partial vacuum is created under the diaphragm 109 which draws in and accelerates air from the inlet 110 over the seat 114. At time $t_1$ as the diaphragm 109 moves further upwards, the end of the spindle 117 engages the valve member 115, unseating it and so opening the exhaust valve. The air drawn under the diaphragm 109 from the inlet 110 is therefore drawn across the bed 108 and its momentum encourages it to continue to move radially in to the center of the bed 108. As it does so it scavenges the depleted air initially present between the bed 108 and the diaphragm 109 and drives it out through the exhaust outlet 115

Having reached its point of maximum displacement the diaphragm 109 then moves downwards towards the bed 108 again. At time $t_2$ the diaphragm 109 again reaches its equilibrium position and closes the inlet and exhaust valves. It should be noted that although there is a delay between the opening of the inlet and exhaust valve resulting from the play on the spindle 117 when the valves close at time $t_2$ they do so simultaneously. During the subsequent phase of the cycle the pressure under the diaphragm 109 increases driving the fresh air drawn through the annular inlet 110 into the zeolite bed 108. As the air moves forwards through the bed 108 the zeolite acts as a molecular sieve, preferentially adsorbing the nitrogen from the air so that the gas passing out through the bottom of the bed 108 is oxygen enriched/nitrogen depleted. Then from time $t_3$ which is the point of maximum displacement in the opposite direction, towards the bed 108, the diaphragm 109 moves back towards its equilibrium position reducing the pressure above the bed 108. Under this reduced pressure nitrogen is desorbed from the bed 108 and drawn back towards the surface. As the diaphragm 109 reaches its equilibrum point the cycle is repeated with the next intake of air driving the oxygen depleted, nitrogen-rich gas from the surface of the bed 108 to the exhaust outlet 115. The cycle accelerates the gas throughout its passage across the face of the bed so that when it reaches the outlet 115 its momentum carries it away from the chamber 101 as a puff of gas which does not mix with the intake to the bed. During successive cycles the oxygen is driven down through the bed to its outer surface where it is conducted away in the manner already described.

Figure 9:
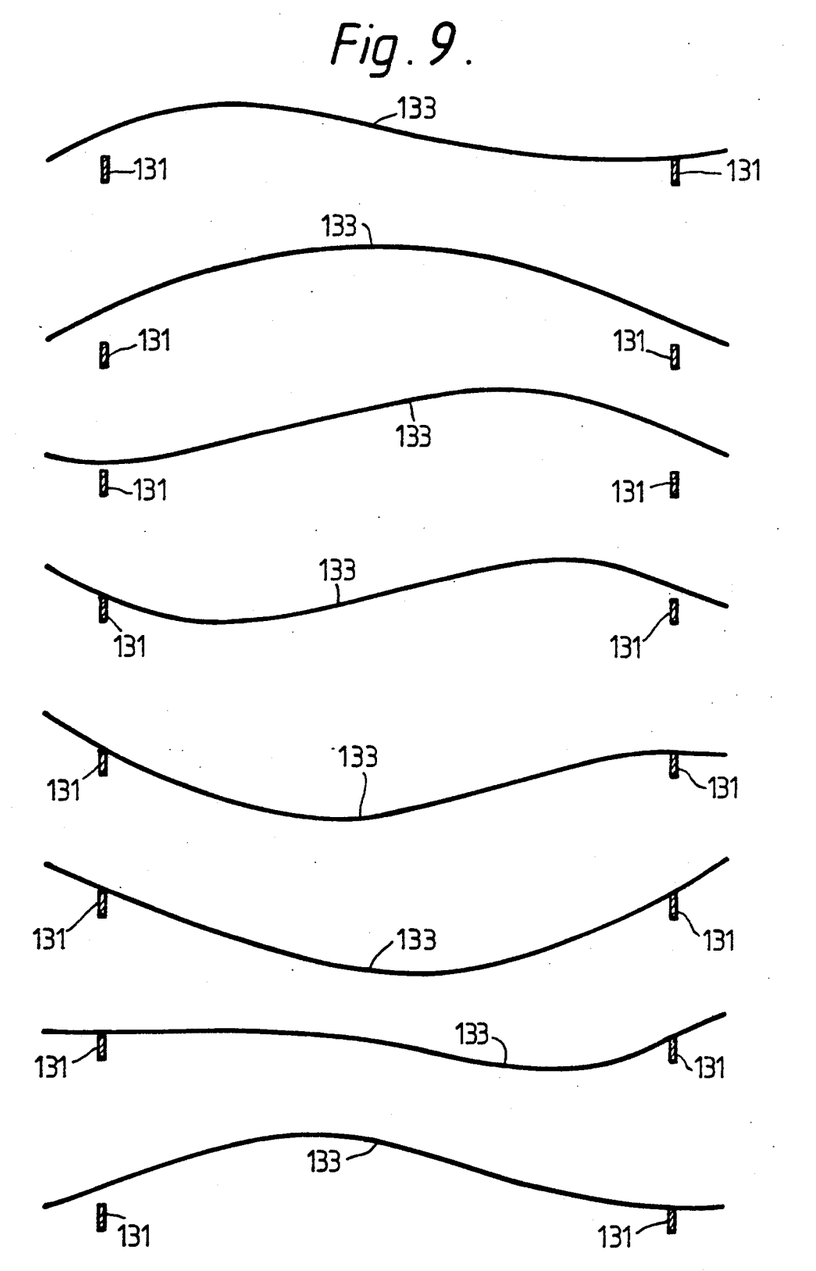
FIG. 9 is a series of cross-sections through the diaphragm of the second example of gas-separator module showing how it flexes; and, FIG. 10 is a cross-section through a third example.

A modification of the gas separator module is shown in FIGS. 7, 8 and 9. In this example an annular valve seat 131 surrounds a dished bed of adsorbent material 132. A thick tuned diaphragm 133 resonates at the resonance frequency of the substantially spherical chamber 101 or ogival resonance chamber 1 (not shown in FIG. 5). The bed 132 and annular valve seat 131 are generally similar to the bed 108 and seat 114. The diaphragm 133 is unbalanced and includes an added mass 134 on one side and a cut-away portion 135, shown in FIG. 8, on its other side. This asymmetry in the diaphragm 133 leads to a harmonic oscillation being generated in the diaphragm 133 as it is oscillated backwards and forwards in the radial direction at the fundamental frequency by the wavefronts propagating in the chamber 1 or 101. This harmonic oscillation has the form of a transverse wave moving from left to right as shown in FIG. 9.

FIG. 9 illustrates this effect diagrammatically. In FIG. 9 the diaphragm 133 is represented by a line with the amplitude of the transverse oscillation greatly exaggerated to illustrate how, as the diaphragm 133 is moving away from the bed 132, first the left hand side, as shown in FIGS. 7, 8 and 9 lifts away from the annular seat 131 so allowing fresh air to be drawn in to the gap formed between the diaphragm 133 and the valve seat 131 at the left hand side of the gas separator module. Further movement of the diaphragm 133 away from the adsorbent bed 132 further reduces the pressure above the adsorbent bed 132, draws in more fresh air from the left hand side of the bed 132 and draws out more of the depleted nitrogen rich gas from the bed 132. As the fresh air moves inwards into the space between the bed 132 and diaphragm 133 it has a significant velocity in a direction from left to right as shown in FIGS. 7, 8 and 9. After reaching its maximum deflection the diaphragm 133 starts to return towards the dished bed 132. Again the left hand side of the diaphragm moves first, as shown most clearly in FIG. 9 and this leads to the left hand side of the diaphragm 133 forming a seal with the annular seat 131 at the left hand side of the diaphragm whilst the right hand side of the diaphragm is still out of contact with the right hand side of the annular seat 131, again as shown in FIG. 9. The transverse movement of air across the face of the dished bed 132 leads to an effective scavenge of the depleted, nitrogen rich air from the surface of the bed 132 and out of the right hand side of the gas separator module between the right hand side of the annular seat 131 and the diaphragm 133. As the diaphragm 133 continues to move towards the adsorbent bed it eventually seats against the entire circumference of the annular seat 131 so closing the valve and pressurizing the fresh air introduced into the module and forcing it into the adsorbent bed 132. After reaching a point of maximum deflection towards the bed 132 the diaphragm again starts to return and move away from the 132. Again it is the left hand side of the diaphragm which first lifts from its annular seat 131 to allow fresh air to enter the module from the left hand side and the process is repeated. The transverse wave action that is induced in the diaphragm 133 also encourages the movement of air in the transverse direction from the left hand side to the right hand side of the gas separator module.

A pressure-swing gas separator such as that described above offers both greater efficiency and lower capital costs by comparison with a conventional oxygen production plant such as a cryogenic oxygen recovery unit. A 2 meter radius sphere having its surface entirely covered by gas-separation modules is capable of producing 100 tonnes per day of 98% oxygen with an oxygen recovery ratio, that is the ratio by volume of oxygen input to oxygen output, of 100:15 and a specific energy consumption, that is the mechanical energy input required to produce 1 kilogram of oxygen, of 0.125 kW hr/kg. The 98% oxygen mixture produced is suitable for use in industrial processes such as iron and steel-making but may also be used for other purposes such as sewage-treatment or the generation of oxygen for medical use. For these alternative uses the scale of the device and the concentration of the oxygen produced may be varied to suit the needs of the particular application. Where only low volumes of oxygen are required a gas-separator unit formed by a single circular bed and diaphragm such as that described above may be used with an ogival gas resonance device such as that described above.

Figure 10:
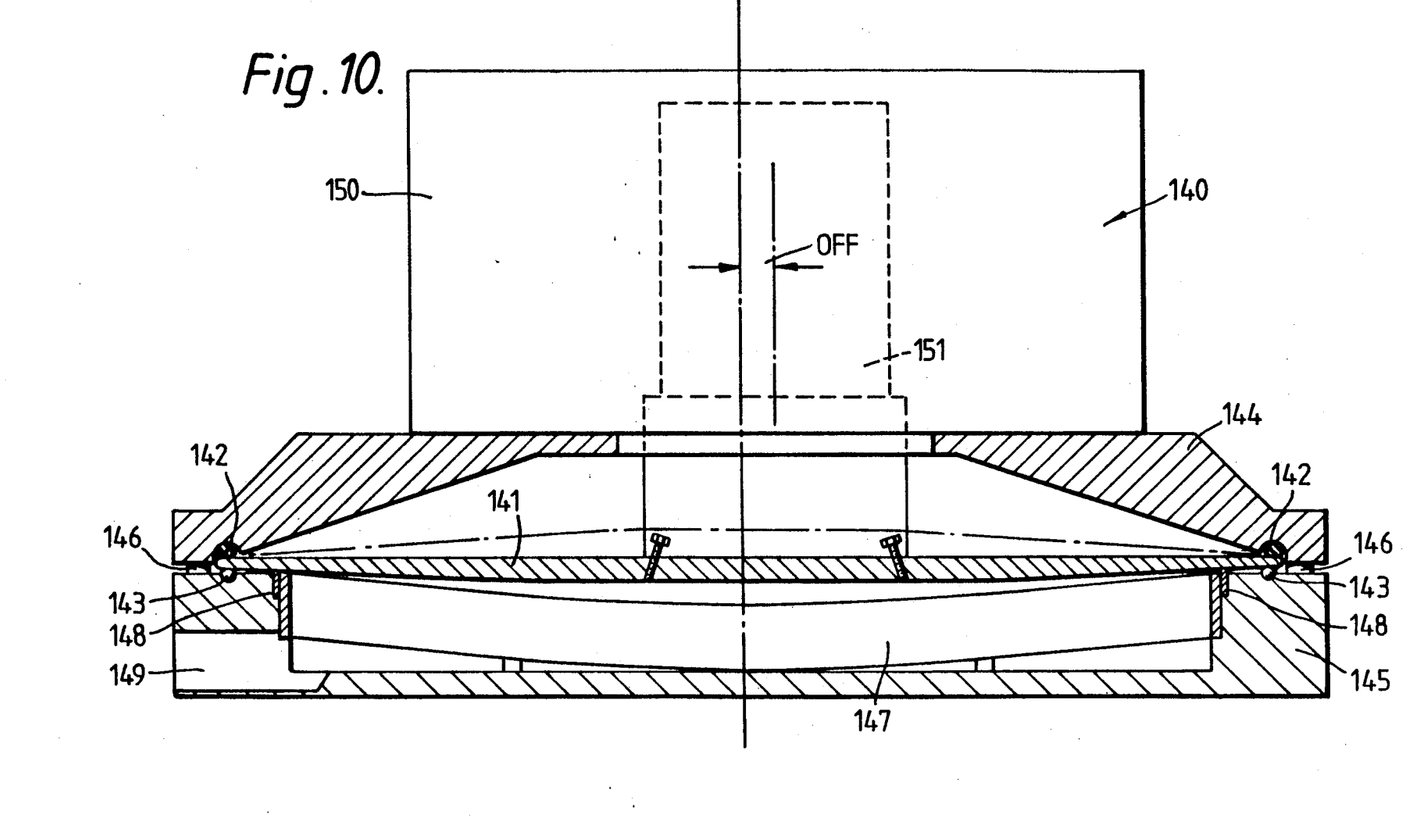

The third example of pressure swing gas separator illustrated in FIG. 10 uses a bed and diaphragm arrangement similar to that in the modification described above but the diaphragm is driven by an electrical actuator 140. The gas separator comprises a diaphragm 141 having its periphery clamped between an O-ring 142 and a number of equiangularly spaced balls 143. The O-ring 142 is received in an annular groove in the top part of a housing 144 whilst the balls 143 are received in the bottom part 145 of the housing. The two halves of the housing are clamped together by bolts 146 clamping the diaphragm 141 between the O-ring 142 and balls 143. A dished bed 147 filled with adsorbent material is located in the bottom half 145 of the housing and surrounded by an annular seal 148 which extends close to the periphery of the diaphragm 141. A gas outlet 149 in communication with the rear face of the bed 147 leads away from the lower half 145 of the housing. The upper part 144 of the housing supports the electrical actuator 140 which consists of a stator 150 which may be a permanent magnet or preferably, is an electro-magnet energized by a DC field coil. An armature, 151 formed by a moving coil is connected to the diaphragm 141 eccentrically. FIG. 10 illustrates the offset OFF between the centre of the diaphragm and the centre of the armature. The arrangement of the electrical actuator 140 is generally similar to that used for driving loudspeakers.

Typically a single phase mains AC current is connected to the moving coil armature 151 and, in response to the alternating current the armature 151 moves up and down, as shown in FIG. 10, to cause the diaphragm 141 to oscillate. The diaphragm 141 is arranged to oscillate at the mains frequency. The lateral offset between the axes of the diaphragm 141 and that of the armature 151 causes the diaphragm to oscillate as described above with reference to FIG. 9.

OUTLINE OF THEORY BEHIND PRESENT INVENTION

Adsorption/desorbtion with rising and falling fluid pressure is capable of separation of species, such as nitrogen and oxygen from air using a zeolite molecular sieve in the form of a porous bed of graded or uniformly sized particles. Typically, mixed gases are introduced at the top of the bed, and one component is withdrawn at a lower flow rate at the base of the bed. Throughputs are determined by the required purity of the separated fraction. The energy efficiency of separation is potentially high for provision of separated gas delivered at atmospheric pressure, and is already higher in practical applications than with any of the cryogenic separation routes.

Molecular selectivity is the basis for separations conducted by adsorption and it is known, for instance, that nitrogen is preferentially adsorbed at a zeolite surface because of its different molecular configuration from that of oxygen. The adsorption process is also completely reversible with change of pressure. The molecular selectivity of zeolite for nitrogen from $N_2/O_2$ mixtures is held to be 2.8 over a wide range of pressures at ambient temperatures. Since molecular processes are intrinsically fast, it is evident that rates of adsorption are limited by diffusion rather than molecular adsorption, since inert components such as argon in air are invariably present and effectively form a barrier between the nitrogen and the adsorbent bed. Furthermore, since adiabatic compression is also reversible, much of the energy of compression may be conserved if a resonant acoustic pressurization system is used, so that the two dominant factors with regard to energy efficiency in the improved process are likely to be frictional flow resistance in the bed, coupled with scavenge flow resistance at atmospheric pressure at the top of the bed. These factors are now examined.

SELECTIVE ADSORPTION

The adsorption of two species B and C of similar densities at a clean surface is considered to be governed by the product of the molecular selectivity s and the relative rates of arrival of the species at the surface, in terms of an inert boundary layer of species A and thickness $\delta$ impeding the flow to the surface, and the mutual diffusivity D of the other two species through this boundary layer. Stefan's law indicates that the overall mass diffusion rate q per unit area of adsorbed species at the interface is, $$q = \frac{D\rho_o}{\delta} \ln c_A \qquad [1]$$

where $\rho_o$ is the overall density and $c_A$ is the small fractional concentration of the inert species A. (The negative sign accounts for the negative logarithm). A qualitative evaluation of equation [1] shows that comparatively high rates of adsorption can be foreseen in an adsorption bed of small particles.

Ignoring density differences, if the species B and C are present as fractional volume concentrations $c_B$ and $c_C$ (such that $c_B + c_C + c_A = 1$) it may be postulated that the effect of the molecular selectivity s, referring to species B and C respectively, is that $$\frac{q_B}{q} = \frac{sc_B}{sc_B + c_C}, \frac{q_C}{q} = \frac{c_C}{sc_B + c_C}, \text{ and } q_B + q_C = q \quad [2]$$

Equation [2] demonstrates that the instantaneous effective selectivity $\sigma$ in the presence of the boundary layer is simply, $$\sigma = \frac{q_B}{q_C} = \frac{sc_B}{c_C} \quad [3]$$

which exceeds s at the start of the process and is progressively reduced.

In order to follow the changes of concentration it is necessary to postulate an initial volume V of mixed gases approaching the interface, progressively reduced in time by adsorption (density difference between species B and C are ignored, together with $c_A$ at this stage). Then, $$c_B = \frac{V_B - \int q_B \, dt}{V - qt}, \quad c_C = \frac{V_C - \int q_C \, dt}{V - qt}, \quad c_B + c_C = 1 \quad [4]$$

Dividing by V, putting $$\frac{qt}{V} = x,$$

where x is the proportion of mixed gas which is adsorbed, and substituting the $q_B$ and $q_C$ from equation [2], $$c_B = \frac{c_{B,0} - \int \frac{sc_B \, dx}{(s-1)c_B + 1}}{1 - x}, \quad [5]$$

$$c_C = \frac{c_{C,0} - \int \frac{c_C \, dx}{(1-s)c_C + s}}{1 - x}$$

where $c_{B,0}$ and $c_{C,0}$ are initial values. From the first of these, by differentiation and separation of variables, $$\frac{dx}{1 - x} = - \frac{(s-1)c_B + 1}{(s-1)c_B(1 - c_B)} \cdot dc_B \quad [6]$$

which leads by integration of both sides and insertion of limits to, $$1 - x = \left[ \frac{(1 - c_{B,0})^s}{c_{B,0}} \cdot \frac{c_B}{(1 - c_B)^s} \right]^{\frac{1}{s-1}} \quad [7]$$

Formulation in terms of $c_C$ in equations [5], [6] and [7] leads as expected to an identical result. Equation [7] may be written as $$1 - x = \left( \frac{k_0}{k_n} \right)^{\frac{1}{s-1}}$$

$$\text{if } k = \frac{(1 - c)^s}{c}.$$

Then, for successive pressure swings, relating to the non-adsorbed delivery fraction, corresponding with concentration terms $k_0, k_1, k_2, \ldots k_n$, the cumulative value $1-x$ is given by, $$1 - x = \left[ \frac{k_0}{k_1} \cdot \frac{k_1}{k_2} \cdot \frac{k_2}{k_3} \cdots \frac{k_{n-1}}{k_n} \right]^{\frac{1}{1-s}} = 1 - x \quad [8]$$

so that the incremental result is the same as for one pressure swing.

LAMINAR FLOW WITHIN THE BED

The Reynold's numbers for small particles and small velocities being small ($<100$), an assumption of laminar flow is well-founded. If z is distance below the entry surface of the bed the mass flow per unit area of bed may be defined as $$q_0 \frac{dp}{dz},$$

where p is pressure excess, and the adsorption mass flow rate is Qp per unit bed volume. Then the pressure decay through the bed is governed by, $$q_0 \frac{d^2p}{dz^2} = Qp, \text{ such that } p = Ae^{-\sqrt{\frac{Q}{q_0 z}}} \quad [9]$$

and the active bed depth and proportional flow rate are unchanged whether A is constant or proportional to sine wt (where w is angular frequency and t is time), provided that Q is constant (i.e. not limited by saturation of adsorption) and laminar flow conditions are maintained. This simply expressed and important result demonstrates that operating frequency can be varied within wide limits. It is convenient in the following to put $A = p \, p_0$, where p is non-dimensional and $p_0$ is atmospheric pressure.

In bed volume V, close packed spheres of uniform diameter d each occupy the volume $$\frac{\pi d^3}{6}.$$

The number n in volume V with packing space ratio $\eta$ is $$\frac{6\eta V}{\pi d^3}.$$

The aggregate surface area in unit volume is $$\pi d^2 \frac{6\eta}{\pi d^3} = \frac{6\eta}{d},$$

hence the equivalent thickness of parallel channel is $$\frac{(1 - \eta)}{3\eta} d.$$

Recognizing that the dimensions of the area $$\frac{6\eta}{d}$$

are $$\frac{L^3}{L} = L^2,$$

the attributions of mean path length and channel cross-section width, per unit volume, are $(3\eta)^{\frac{1}{2}}$ and respectively, which account for pore volume ratio $1-\eta$ when multiplied together and with channel thickness $$\frac{(1-\eta)}{3\eta} d.$$

The effective pressure gradient is then $$\frac{p'p_o}{(3\eta)^{\frac{1}{2}}}$$

to account for the stretched path, where p' is a non-dimensional pressure gradient.

The laminar flow rate $q = q_0 p'$ is given by, $$q = \frac{(3\eta)^{\frac{1}{2}}}{d} \cdot \frac{p'p_o\rho_o}{(3\eta)^{\frac{1}{2}}} \left(\frac{1-\eta}{3\eta}\right)^3 \frac{d^3}{12\mu} = \frac{p'p_o\rho_o d^2}{12\mu} \left(\frac{1-\eta}{3\eta}\right)^3 \quad [10]$$

where $\mu$ is viscosity, of dimensions $$\frac{M}{LT}.$$

The corresponding adsorption mass flow rate is given by, $$Q = \frac{6\eta}{d} \left(\frac{6\eta}{1-\eta}\right) \frac{pp_oD \ln c_A}{d} = \frac{pp_oD \ln c_A (6\eta)^2}{d^2(1-\eta)} \quad [11]$$

so that the ratio $$\sqrt{\frac{Q}{q_o}} = \frac{1}{a}$$

is then given by, $$a = \left(\frac{1-\eta}{6\eta}\right)^2 \frac{d^2}{3} \sqrt{\frac{p_o}{\eta \mu D \ln c_A}} \quad [12]$$

and the bed entry velocity v by, $$v = p \frac{1-\eta}{3\eta} \sqrt{\frac{\eta p_o D \ln c_A}{\mu}} \quad [13]$$

It may be noted from equation [12] that active bed depth, which is a multiple of a, is proportional to $d^2$, whereas from equation [13], v is independent of d. Both expressions show a significant influence of packing ratio $\eta$, since both active bed depth and v are reduced as $\eta$ is increased.

It may further be noted that average work rate per unit bed area during cyclic operations is $$\frac{pp_o v}{2},$$

and that the component of specific energy of separation attributed to bed friction (kWhr/m³ of component) is $$\frac{\pi p}{72(1-x)},$$

where $1-x$ is the recovery ratio related to a particular concentration, derived from equation [7]. These expressions continue to be independent of operating frequency, and the specific energy is also independent of v. The relevant expression may be applied similarly to characterize non-resonant separation beds, and is well correlated with results obtained from them. The enhanced economy of resonant operation with much lower pressure amplitudes in accordance with this invention is thereby emphasized.

BED FLOW MODEL COMPARISON

Bead volume $= \frac{\pi d^3}{6}$

Number of beads $\frac{6\eta}{\pi d^3}$ per unit volume.

The comparison of results shown below arises from the alternative of a tube nest model (bore diameter D) to the original model envisaging a stack of separated plates. The results are similar, but lead to simpler expressions indicative of smaller adsorptions but larger mass flow rates, entry velocities, and active bed lengths. As such, they are probably optimistic, and the plate model is preferred. The difference is small, about 20%, for the important bed entry velocity criterion V.

Aggregate area $\frac{6\eta}{d}$ per unit volume.

| Plate Analogy | Tube Analogy |
|---|---|
| Channel face area $2 \times \frac{3\eta}{d}$ | Wall face area $m\pi D = \frac{6\eta}{d}$ |
| Channel thickness $\frac{1-\eta}{3\eta} d$ | Tube volume $\frac{\pi D^2}{m4} = 1 - \eta$ |
| Channel width $\frac{(3\eta)^{\frac{1}{2}}}{d}$ | Tube diameter $D = \frac{2(1-\eta)}{3\eta} d$ |
| Path length $(3\eta)^{\frac{1}{2}}$ | Number of tubes |
| Pore volume ratio $(1-\eta)$ | $m = \frac{(3\eta)^2}{\pi d^2(1-\eta)}$ |
| Boundary layer thickness | Boundary layer thickness |
| $\frac{(1-\eta)}{6\eta} d$ | $\frac{(1-\eta)}{3\eta} d$ |
| Mass flow rate | Mass flow rate |
| $q = \frac{p'p_o\rho_o d^2}{12\mu} \left(\frac{1-\eta}{3\eta}\right)^3$ | $q = \frac{p'p_o\rho_o d^2}{8\mu} \frac{(1-\eta)^3}{(3\eta)^2}$; $\left(x\frac{9\eta}{2}\right)$ |
| Mass adsorption | Mass adsorption |
| $Q = \frac{pp_oD\ln c_A(6\eta)^2}{d^2(1-\eta)}$ | $Q = \frac{pp_oD\ln C_A(6\eta)^2}{2d^2(1-\eta)}$; $(x\frac{1}{2})$ |

-continued

Aggregate area $\frac{6\eta}{d}$ per unit volume.

| Plate Analogy | Tube Analogy |
|---|---|
| $a = \sqrt{\frac{q}{Q}} =$ | $a = \sqrt{\frac{q}{Q}} =$ |
| $\left(\frac{1-\eta}{6\eta}\right)^2 \frac{d^2}{3} \sqrt{\frac{po}{\eta\mu D\ln C_A}}$ | $\left(\frac{1-\eta}{6\eta}\right)^2 d^2 \sqrt{\frac{po}{\mu D\ln C_A}}$ ; |
|  | $(\times 3\sqrt{\eta})$ |
| $V = p\frac{1-\eta}{3\eta} \sqrt{\frac{\eta po D\ln C_A}{\mu}}$ | $V = p\frac{1-\eta}{2} \sqrt{\frac{po D\ln C_A}{\mu}}$ ; |
|  | $\left(\times \frac{3\sqrt{\eta}}{2}\right)$ |

By way of conservatism both models incorporate the maximum possible boundary layer thickness, and neglect adsorption surfaces within the beads. However, they do not account for the irregularities of cross-section of the gas paths, which will have less effect with laminar flow than with turbulent flow.

The distinctions between acoustic pressure swing gas separation and rapid pressure swing adsorption.

The most obvious, but superficial difference is one of frequency, where the rapid pressure swing adsorption system (RPSA) employs sequenced valves to alternately pressurize and depressurize, and the acoustic system uses resonant oscillations in order to conserve the pressure energy contained in the gas component rejected after separation of another component. On this basis the usable frequency bands of the two systems are likely to be contiguous, and without overlap.

The bed loading analysis which this statement supports verifies that smaller pressure swing amplitudes and entry velocities are preferred for the acoustic variant than for RPSA in order to reduce bed friction losses. For a given throughput bed area is therefore larger with the acoustic variant, but is compensated by much less depth. A substantial increase of energy efficiency of separation is obtained in this way for acoustic separation.

The use of small beads (<250 μm) is preferred for both variants if pure gas is required from the separation. This may be attributed to the preponderance of laminar flow over turbulent flow through the bed in such cases, so that turbulent back-diffusion and therefore loss of the separated component is suppressed. The criterion for laminar flow is a low value of Reynold's number, essentially dependent upon the product of bead size and flow velocity. Laminar flow is therefore better established for the acoustic variant at a given bead size with lower bed entry velocities.

The most fundamental distinction between RPSA and acoustic pressure swing separation by adsorption, is that the former makes use of saturation of adsorption at bed entry conditions, whereas the acoustic variant does not. Thus, with RPSA when pressure is applied it rises quickly and then stays constant at entry for most of the cycle while the bed is charged. A wave of pressure and adsorption then passes down the bed, although with exponential type decay of amplitude. This accounts for the need for comparatively long beds, but extends the throughput. As shown in the analysis, a sufficient degree of adsorption is obtainable at enhanced frequency to obviate the need to make use of saturation, and this is why the acoustic bed can achieve the same volumetric loadings at lower entry pressures and velocities and higher energy efficiencies.

Both variants use a superimposed steady gas flow through the bed to extract the separated component, and the proportion extracted in this way determines its purity. Of necessity therefore, both variants make use of saturation at the low, constant pressure at the base of the bed, since adsorption eventually ceases when pressure is constant at any value.

In summary, the bed loading criterion for acoustic pressure swing separation is entry velocity and not frequency. At high frequencies bed diameters are preferably small in order to limit energy losses from high scavenge velocities.

The pressure swing gas separation bed energized by an oscillatory diaphragm.

The ultimate rationalization of scavenge gas flow across the top of the bed is achieved if the central gas outlet and valve are dispensed with, and the diaphragm is given an additional harmonic mode of oscillation, which is of small amplitude, antisymmetric and at the same frequency. The motion of the diaphragm is then equivalent to that which would be produced by a crank and connecting rod with small end stiffly attached to the centre of the diaphragm. The effect of this modified motion is to open the peripheral valve at one side (subtending 180°) early, and to close the other side later, so ensuring one sweep of incoming gas, preceeding continuously from the first side to be expelled at the second, with a straight line gas flow across the bed, minimal pressure drop, and less dependence upon meticulous adjustment, as for instance of a second valve.

The required motion can be obtained simply and in various ways, 1) obviously by the crank connection alluded to above, 2) by electromagnetic drive from an AC source with the armature coil connected to the diaphragm at a position slightly off-centre, and 3) by attaching a small ballast mass off-centre (with or without a partial cut-out to reduce mass locally at a position diametrically opposite to the added mass) when the diaphragm oscillations are driven by pulsating gas pressure applied to the remote face.

The preferred method of driving the diaphragm in small acoustic pressure swing equipments is likely to be electromagnetic at the electric supply frequency. For this purpose the armature attached to the diaphragm is preferably a moving coil, energized by single phase AC, and the stator is a magnet with annular air gap engaging the moving coil, as used for driving loudspeakers. This magnet could be permanent, or be energized by a DC field coil, and the latter is preferred, except in very small size.

I claim:

1. A method of operating a pressure swing gas separator which is cycled between pressurized and depressurized states, wherein a pressure difference of less than 0.1 bar exists between said pressurized and depressurized states.

2. A method of operating a pressure swing gas separator which is cycled between pressurized and depressurized states wherein a repetition frequency of said cycling is greater than one cycle per second.

3. The method of claim 2, wherein said repetition frequency is in a range between 50 and 200 cycles per second.

4. A method of operating a pressure swing gas separator which is cycled between a pressurized state and a depressurized state, the pressure difference subsisting between said pressurized and said depressurized states being less than 0.1 bar and said pressure swing gas separator being cycled at a repetition frequency greater than 1 cycle per second.

5. The method according to claim 4, wherein said repetition frequency is greater than 10 cycles per second.

6. The method of claim 4, wherein said repetition frequency is in a range from 50 to 200 cycles per second.

7. A pressure swing gas separator comprising:
(a) a resonant system having a natural resonant frequency;
(b) a bed of adsorbent material, said bed of adsorbent material being located in and forming part of said resonant system; and,
(c) means operating at said natural resonant frequency of said resonant system alternately to pressurize and depressurize said bed of adsorbent material whereby pressure energy of a gas mixture desorbed from said adsorbent bed is substantially recovered.

8. The apparatus of claim 7, wherein said natural resonant frequency of said resonant system is greater than 1 cycle per second.

9. The apparatus of claim 8, wherein said means operating at said natural resonant frequency of said resonant system to pressurize and depressurize said bed of adsorbent material imposes a pressure difference of less than 0.1 bar between said states.

10. The apparatus of claim 7, wherein said natural resonant frequency of said resonant system is greater than 10 cycles per second.

11. The apparatus of claim 10, wherein said means operating at said natural resonant frequency of said resonant system to pressurize and depressurize said bed of adsorbent material imposes a pressure difference of less than 0.1 bar between said states.

12. The apparatus of claim 10, wherein said means operating at said natural resonant frequency of said resonant system to pressurize and depressurize said bed of adsorbent material comprises a thermally driven gas resonance device.

13. The apparatus of claim 12, wherein said thermally driven gas resonance device comprises a resonant tube of ogival form which expands in cross-section along its length from one end to the other, a heat source located at said one end of said resonance tube, and means to trigger oscillations in a gas in said resonance tube.

14. The apparatus of claim 13, wherein said means to trigger oscillations in said gas in said resonance tube are formed by a pulsed combustor having a pulse repetition frequency corresponding to said natural resonance frequency.

15. The apparatus of claim 12, wherein said thermally driven gas resonance device comprises a pulsed combustor located in the middle of a substantially spherical resonance chamber, said pulsed combustor having a pulse repetition frequency corresponding to said natural resonance frequency.

16. The apparatus of claim 15, wherein said substantially spherical resonance chamber is formed as an icosahedron.

17. The apparatus of claim 16, wherein said bed of adsorbent material has a generally circular configuration with three of said circular beds contained wholly within each substantially triangular segment of said icosahedron and one of said generally circular beds at each point of said icosahedron.

18. The apparatus of claim 7, wherein said natural resonant frequency of said resonant system is in a range from 50 to 200 cycles per second.

19. The apparatus of claim 18, wherein said means operating at said natural resonant frequency of said resonant system to pressurize and depressurize said bed of adsorbent material imposes a pressure difference of less than 0.1 bar between said states.

20. The apparatus of claim 7, wherein said means operating at said natural resonant frequency of said resonant system to pressurize and depressurize said bed of adsorbent material imposes a pressure difference of less than 0.1 bar between said states.

21. The apparatus of claim 7, wherein said means operating at said natural resonant frequency of said resonant system to pressurize and depressurize said bed of adsorbent material comprises a thermally driven gas resonance device.

22. A pressure swing gas separator including:
(a) a bed of adsorbent material, said bed of adsorbent material having one and another face;
(b) a tuned diaphragm having a natural resonant frequency, said tuned diaphragm being located adjacent but spaced from said one face of said bed of adsorbent material to provide a space between said diaphragm and said one face of said bed of adsorbent material;
(c) diaphragm driving means, said diaphragm driving means being arranged to drive said diaphragm at its natural resonant frequency towards and away from said bed of adsorbent material;
(d) valve means, said valve means introducing a gas mixture to and exhausting a depleted gas mixture from said space formed between said diaphragm and said one face of said bed of adsorbent material; and,
(e) a gas outlet, said gas outlet being in communication with said other face of said bed of adsorbent material, wherein, in use, movement of said diaphragm towards and away from said one face of said bed of adsorbent material pressurizes and depressures said bed, of adsorbent material.

23. The apparatus of claim 22, wherein said means operating at said natural resonant frequency of said resonant system to pressurize and depressurize said bed of adsorbent material comprises a thermally driven gas resonance device.

24. The pressure swing gas separator of claim 23, wherein said thermally driven gas resonance device comprises a resonance tube of ogival form which expands in cross-section along its length from one end to the other, a heat source located at said one end of said resonance tube, and means to trigger oscillations in a gas in said resonance tube.

25. The pressure swing gas separator of claim 24, wherein said means to trigger oscillations in said gas in said resonance tube is formed by a pulsed combustor having a pulse repetition frequency corresponding to said natural resonance frequency.

26. The pressure swing gas separator of claim 23, wherein said thermally driven gas resonance device comprises a pulsed combustor located in the middle of a substantially spherical resonance chamber, said pulsed combustor having a pulse repetition frequency corresponding to said natural resonance frequency.

27. The pressure swing gas separator of claim 26, wherein said substantially spherical resonance chamber is formed as an icosahedron.

28. The pressure swing gas separator of claim 27, wherein said bed of adsorbent material has a generally circular configuration with three of said circular beds contained wholly within each substantially triangular segment of said icosahedron and one of said generally circular beds at each point of said icosahedron.

29. The pressure swing gas separator of claim 22, wherein said drive means for said diaphragm is formed by an electrical actuator.

30. The pressure swing gas separator of claim 29, which also includes a fixed surrounding framework, and wherein said electrical actuator comprises an armature coil and a stator, one of said armature coil and stator being connected to said diaphragm and the other of said armature coil and stator being connected to said fixed surrounding framework, in use, an oscillating current being applied to said armature to cause said armature to oscillate with respect to said stator and hence cause said diaphragm to oscillate with respect to said fixed surrounding framework.

31. The pressure swing gas separator of claim 30, wherein said stator is formed by a permanent magnet.

32. The pressure swing gas separator of claim 30, wherein said stator is formed by an electro-magnet.

33. The pressure swing gas separator of claim 22, wherein said valve means to introduce gas mixture into and exhaust gas mixture from said space between said diaphragm and said bed of adsorbent material comprises an annular valve seat which engages said diaphragm and said diaphragm forms the valve closure member of said valve means and forms a gas-tight seal against said annular valve seat.

34. The pressure swing gas separator of claim 33, wherein means are provided to superimpose a harmonic oscillation onto said diaphragm whereby one side of said diaphragm separates from said annular valve seat before the other side.

35. The pressure swing gas separator of claim 34, wherein said means to apply a harmonic oscillation comprise an eccentric mass located on one side of the diaphragm.

36. The pressure swing gas separator of claim 34, wherein said means to apply a harmonic oscillation is formed by an eccentric connection between said drive means and said diaphragm.

37. The pressure swing gas separator of claim 22, wherein said bed of adsorbent material has a particle size of no more than ¼ mm.

* * * * *